United States Patent
Kato et al.

(10) Patent No.: US 6,640,454 B2
(45) Date of Patent: Nov. 4, 2003

(54) ELECTRONIC INSTRUMENT HAVING A MAGNETIC SENSOR

(75) Inventors: Kazuo Kato, Chiba (JP); Shoji Nirasawa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/778,461

(22) Filed: Feb. 7, 2001

(65) Prior Publication Data

US 2001/0013777 A1 Aug. 16, 2001

(30) Foreign Application Priority Data

Feb. 16, 2000 (JP) ......................................... 2000-038438

(51) Int. Cl.[7] .............................................. G01C 17/38
(52) U.S. Cl. ........................ 33/356; 33/DIG. 1; 324/247
(58) Field of Search ......................... 33/356, 357, 358, 33/355 R, DIG. 1, 366.11; 324/225, 252, 247; 368/10

(56) References Cited

U.S. PATENT DOCUMENTS

| 4,179,741 A | * | 12/1979 | Rossani ....................... 701/224 |
| 4,482,255 A | | 11/1984 | Gygax et al. .................. 368/10 |
| 4,668,100 A | * | 5/1987 | Murakami et al. ............. 368/10 |
| 5,187,872 A | * | 2/1993 | Dufour ......................... 33/356 |
| 5,481,506 A | * | 1/1996 | Kita ............................ 368/10 |
| 5,511,319 A | * | 4/1996 | Geerlings et al. ............. 33/356 |
| 5,521,501 A | * | 5/1996 | Dettmann et al. ........... 324/252 |
| 5,596,551 A | * | 1/1997 | Born et al. .................... 368/10 |
| 5,850,624 A | * | 12/1998 | Gard et al. .................... 702/92 |
| 5,883,861 A | * | 3/1999 | Moser et al. .................. 368/10 |
| 6,286,221 B1 | * | 9/2001 | Voto et al. .................... 33/356 |
| 6,385,133 B1 | * | 5/2002 | Miyauchi ...................... 368/10 |
| 2002/0023362 A1 | * | 2/2002 | Kato ............................ 33/356 |

FOREIGN PATENT DOCUMENTS

| EP | 1024345 | 8/2000 |
| JP | 03071011 | 3/1991 |
| JP | 06300869 | 10/1994 |
| JP | 10170663 | 6/1998 |
| WO | 99067596 | 12/1999 |

OTHER PUBLICATIONS

Patent Abstracts of Japan, vol. 1998, No. 11, Sep. 30, 1998 EPO publication No. 10170663 dated Jun. 26, 1998.
Patent Abstracts of Japan, vol. 1995, No. 01, Feb. 28, 1995 EPO publication No. 06300869 dated Oct. 28, 1994.
Patent Abstracts of Japan, vol. 015, No. 230, Jun. 12, 1991 EPO publication No. 03071011 dated Mar. 26, 1991.

* cited by examiner

Primary Examiner—Diego Gutierrez
Assistant Examiner—R. Alexander Smith
(74) Attorney, Agent, or Firm—Adams & Wilks (57) ABSTRACT

Arranging a magnetic sensor in a position within $2^{-1/2}$ of the radius from the center of a component in a circular shape assuming magnetism, and correcting deflection by deflection amount correcting circuit of an output from the magnetic sensor in accordance with the relative position between the magnetic sensor and the component.

8 Claims, 11 Drawing Sheets

ELONGATION STRESS

ELECTRONIC INSTRUMENT HAVING A MAGNETIC SENSOR

BACKGROUND OF THE INVENTION

1. Field of the Invention

The present invention relates to an electronic instrument having a magnetic sensor, particularly to an electronic azimuth indicator including a part having magnetic susceptibility that affects a magnetic sensor, or to a various kinds of electronic instruments provided with such an electronic azimuth indicator.

2. Description of the Prior Art

As an example of such an electronic instrument that has been conventionally used, there is a wristwatch provided with an electronic azimuth indicator. Such a wristwatch with an electronic azimuth indicator has a problem that, when a magnetic sensor is arranged in the vicinity of a part that is susceptible to magnetization or a part assuming magnetism, accurate detection of a direction is difficult because such a part adversely affect the magnetic sensor.

Figure 14:
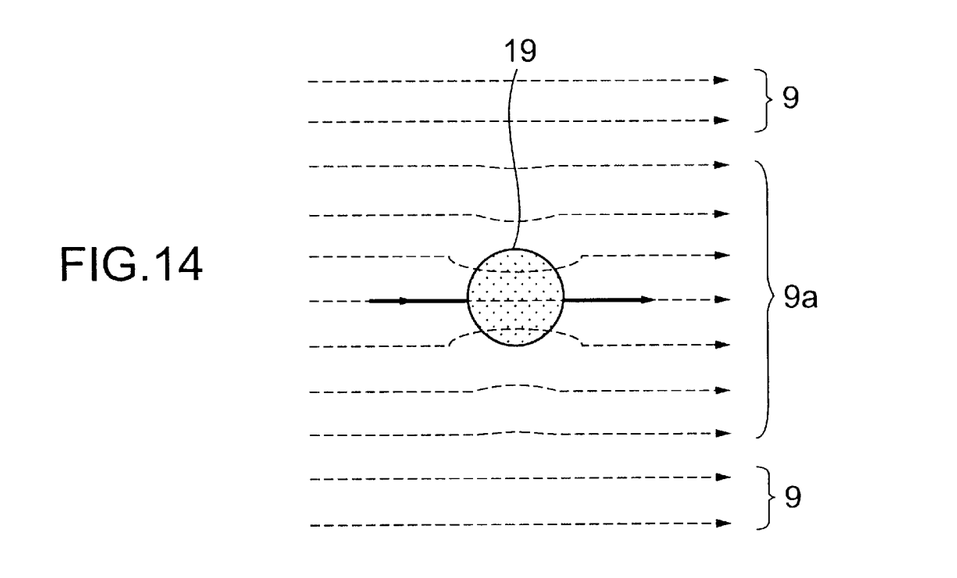
FIG. 14 is a diagram showing a state of a magnetic field in which a spherical magnetic body is arranged in an even magnetic field.

To describe it more concretely, geomagnetism can be generally regarded as an even magnetic field. When a spherical magnetic body is arranged in such an even magnetic field, the magnetic field is distorted as shown in FIG. 14. FIG. 14 shows a state of the magnetic field in which a spherical magnetic body is arranged in an even magnetic field. As can be seen from the figure, the direction of the magnetic field is deflected to the direction of a spherical magnetic body 19 as shown by a magnetic field 9a in the vicinity of the spherical magnetic body 19. Such a phenomenon is observed when an article assuming magnetism (a magnetic body) is placed within the magnetic field.

In addition, an electronic instrument such as a wristwatch with an electronic azimuth indicator uses a magnetic body such as a battery and a capacitor, and particularly there are a lot of button batteries that use 304 stainless steel processed to have a circular shape. Although it is generally considered that such 304 stainless steel does not have magnetism, when the stainless steel elongates due to die cutting or bending, magnetism may occur in the direction of the elongation.

Figure 15:
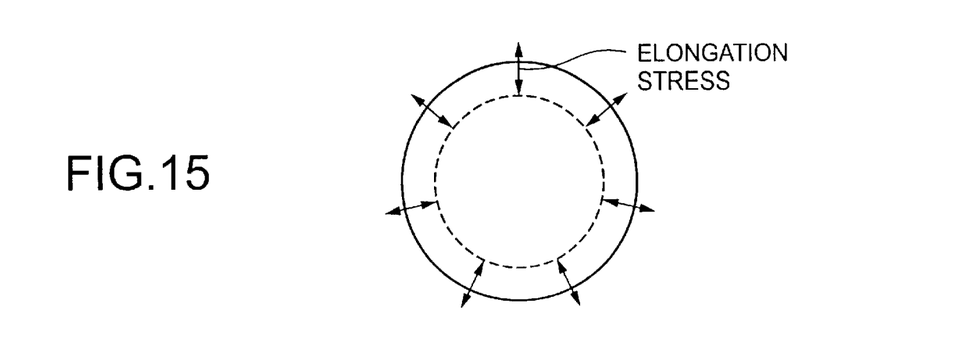
FIG. 15 is an illustration explaining magnetism generated by elongation when 304 stainless steel and the like is subjected to die cutting or bending.

For example, as shown in FIG. 15, if the entire outer configuration of the circular stainless steel is processed to elongate in the circumference direction, the elongation occurs from the inside to the outside with respect to the outer configuration as shown by arrows. Magnetism is observed with the direction of the elongation as an axis.

Therefore, when it is necessary to arrange a magnetic sensor in the vicinity of a magnetic body or a button battery, there is a possibility that detection of magnetic field components is adversely affected due to the above-mentioned effects.

A prior art attempt at solving this problem is described in Japanese Patent Application Laid-open No. Hei 6-300869. In this prior art reference, a distance between various kinds of electronic parts and a magnetic sensor that is sufficient to eliminate influence of the electronic parts is studied in detail, and the position of the magnetic sensor is determined based on the study. That is, the magnetic sensor is arrange as far as possible from an electronic part that is susceptible to magnetization to make the influence of the electronic part to the magnetic sensor minimum.

[Problems to be Solved by the Invention]

However, the invention described in the Japanese Patent Application Laid-open No. Hei 6-300869 has a problem that, since a magnetic sensor is arranged apart from an electronic part that is susceptible to magnetization, the configuration of the magnetic sensor is considerably limited regarding a place where it is arranged, which is a substantial restriction in designing the product. Particularly, since there is a strong need for miniaturization of a portable electronic apparatus, this restriction in arrangement is a large problem from the viewpoint of securing freedom of designing including planning. Such a restriction in arrangement not only poses a problem of not being capable of adopting a novel form conforming to a fashion as an outward design (form), but also is a problem in an aspect of functionality.

That is, a size and form are a part of important functions in itself in a portable electronic instrument. For example, in the case of a portable electronic instrument, particularly a wristwatch, or a barometer, a pressure gauge and the like that are used in skydiving, skin diving or the like, a shape with a part carelessly protruding from the outer configuration or a too large shape is not only inconvenient for handling, but also is an obstacle in an emergency operation, which even has a possibility of resulting in an unexpected accident.

Further, since it is necessary to secure a distance between a part that is susceptible to magnetization and a magnetic sensor, a frame and a substrate that support the part and the sensor inevitably take a large shape. Thus, there is a problem that materials used in the frame, the substrate and the like increase in volume, which not only increases manufacturing costs but also increases packaging costs and transportation costs.

SUMMARY OF THE INVENTION

Therefore, it is an object of the present invention to provide an electronic instrument that uses a magnetic sensor and a circular or substantially circular component assuming magnetism, wherein it is not necessary to arrange the magnetic sensor spaced apart from the component. It is another object of the present invention to provide an electronic instrument that uses a circular or substantially circular component assuming magnetism in the vicinity of the circumference thereof and a magnetic sensor during processing steps of making materials and parts circular or substantially circular shape, wherein it is not necessary to arrange the magnetic sensor spaced apart from the component.

In order to attain the above-mentioned objects, a first aspect of the present invention is an electronic instrument characterized by comprising: a circular or substantially circular component that is susceptible to magnetization; a magnetic sensor to output a signal corresponding to a direction of a magnetic field that is arranged in an arbitrary position in a distance within the area of approximately $2^{-1/2}$ of the radius from the center of the circular or substantially circular component; and correcting circuit to correct the signal outputted from the magnetic sensor in accordance with the relative position between the component and the magnetic sensor.

With this configuration, even if the magnetic sensor is located in the upper or lower side of the circular or substantially circular component that is susceptible to magnetization, since the magnetic sensor can be arranged in an arbitrary position as long as it is within a predetermined distance from the center of the component, freedom of selecting a place where the magnetic sensor is arranged is expanded in designing the electronic instrument, and miniaturization and the like of an electronic instrument can be attained while maintaining high precision.

An electronic instrument in accordance with a second aspect of the present invention is an electronic instrument having a magnetic sensor, characterized by comprising: a circular or substantially circular component that is susceptible to magnetization; a magnetic sensor to output a signal corresponding to a direction of a magnetic field that is arranged in an arbitrary position on a straight line passing the center of the component such that the straight line and a detection axis of the magnetism coincide; and correcting circuit to correct the signal outputted from the magnetic sensor in accordance with the relative position between the component and the magnetic sensor.

With this configuration, even if the magnetic sensor cannot be arranged in an arbitrary position within a predetermined distance from the center of the circular or substantially circular component that is susceptible to magnetization, since it is possible to arrange the magnetic sensor in an arbitrary position on a straight line passing the center of the component such that the straight line and a detection axis of the magnetism coincide, freedom of selecting a place where the magnetic sensor is arranged is expanded in designing the electronic instrument, and miniaturization and the like of an electronic instrument can be attained while maintaining high precision.

An electronic instrument in accordance with the third aspect of the present invention is an electronic instrument having a magnetic sensor, characterized by comprising: a circular or substantially circular component that is susceptible to magnetization; an X axis magnetic sensor for detecting a magnetic field component in an X axis direction that is arranged in an arbitrary position in a distance within the area of approximately $2^{-1/2}$ of the radius from the center of the component, or is arranged such that a detection axis of the magnetic sensor overlaps an X axis passing through the center of the component in an arbitrary position on the X axis or on its extended line; a Y axis magnetic sensor for detecting a magnetic field component in a Y axis direction that is arranged in an arbitrary position in a distance within the area of approximately $2^{-1/2}$ of the radius from the center of the component, or is arranged such that a detection axis of the magnetic sensor overlaps a Y axis passing through the center of the component and perpendicular to the X axis in an arbitrary position on the Y axis or on its extended line; and correcting circuit to correct the signals outputted from the X axis magnetic sensor and the Y axis magnetic sensor in accordance with the relative position between the component and the X and Y magnetic axes.

With this configuration, since each of the X axis magnetic sensor and the Y axis magnetic sensor can be arranged in an arbitrary position within a predetermined distance from the center of the circular or substantially circular component, or in an arbitrary position on a straight line passing the center of the component where the arbitrary line and a detection axis of the magnetism coincide, freedom of designing can be further increased, and miniaturization and the like of an electronic instrument can be attained while maintaining high precision.

An electronic instrument in accordance with a fourth aspect of the present invention is an electronic instrument having a magnetic sensor characterized in that the component that is susceptible to magnetization is a battery made of 304 stainless steel. Recently, there are many electronic parts such as a button battery that have the size of the above-mentioned battery, which in conjunction with this configuration, makes it possible to make an electronic instrument using such a battery higher in performance, miniaturized, and so forth.

An electronic instrument in accordance with a fifth aspect of the present invention is an electronic instrument having a magnetic sensor, characterized by comprising: a circular or substantially circular component assuming magnetism in the vicinity of its circumference by processing; a magnetic sensor to output a signal corresponding to a direction of a magnetic field that is arranged in a position inside the vicinity of the circumference assuming magnetism of the circular or substantially circular component; and correcting circuit to correct the signal outputted by the magnetic sensor in accordance with the relative position between the component and the magnetic sensor.

With this configuration, even if the magnetic sensor is arranged in the upper and the lower side of the circular or substantially circular component assuming magnetism in the vicinity of its circumference by processing, since the magnetic sensor can be arranged in an arbitrary position as long as it is within a predetermined distance from the center of the component, freedom of selecting a place where the magnetic sensor is arranged is expanded in designing the electronic instrument, and miniaturization and the like of an electronic instrument can be attained while maintaining high precision.

An electronic instrument in accordance with a sixth aspect of the present invention is an electronic instrument having a magnetic sensor, characterized by comprising: a circular or substantially circular component assuming magnetism in the vicinity of its circumference by processing; a magnetic sensor to output a signal corresponding to a direction of a magnetic field that is arranged in an arbitrary position on a straight line passing the center of the component such that the straight line and a detection axis of magnetism coincide; and correcting circuit to correct the signal outputted from the magnetic sensor depending on the relative position between the component and the magnetic sensor.

With this configuration, even if the magnetic sensor cannot be arranged in an arbitrary position within a predetermined distance from the center of the circular or substantially circular component assuming magnetism in the vicinity of its circumference by processing, since the magnetic sensor can be arranged in an arbitrary position on an arbitrary straight line passing through the center of the component such that the straight line and an detection axis of magnetism coincide, freedom of selecting a place where the magnetic sensor is arranged is expanded in designing the electronic instrument, and miniaturization and the like of an electronic instrument can be attained while maintaining high precision.

An electronic instrument in accordance with a seventh aspect of the present invention is an electronic instrument having a magnetic sensor, characterized by comprising: a circular or substantially circular component assuming magnetism in the vicinity of its circumference by processing; an X axis magnetic sensor for detecting a magnetic field component in an X axis direction that is arranged in a position inside the vicinity of the circumference assuming magnetism of the circular or substantially circular component, or is positioned such that a detection axis of the magnetic sensor overlaps an X axis passing the center of the component in an arbitrary position on the X axis or on its extended line; a Y axis magnetic sensor for detecting a magnetic component in a Y axis direction that is arranged inside the vicinity of the circumference assuming magnetism of the circular or substantially circular component, or is arranged such that a detection axis of the magnetic sensor overlaps a Y axis passing the center of the component and perpendicular to the X axis in an arbitrary position on the Y axis or on its extended line; and correcting circuit to correct the signals outputted from the X axis magnetic sensor and the Y axis magnetic sensor in accordance with the relative position between the magnetic sensor and the X axis and the Y axis magnetic sensors.

With this configuration, since each of the X axis magnetic sensor and the Y axis magnetic sensor can be arranged in an arbitrary position within a predetermined distance from the center of the circular or substantially circular component assuming magnetism in the vicinity of its circumference by processing or in an arbitrary position on an arbitrary straight line passing the center of the component such that the straight line and an detection axis of magnetism coincide, freedom of designing can be further increased, and miniaturization of an electronic instrument can be attained while maintaining high precision.

An electronic instrument in accordance with an eighth aspect of the present invention is an electronic instrument having a magnetic sensor characterized in that the circular or substantially circular component assuming magnetism in the vicinity of its circumference by processing is a battery made of 304 stainless steel.

With this configuration, in conjunction with existing many electronic parts such as a button battery that have the size of the above-mentioned battery, an electronic instrument using such an electronic part can be made higher in performance, further miniaturized, and so forth.

An electronic instrument in accordance with a ninth aspect of the present invention is an electronic instrument having a magnetic sensor, characterized in that the magnetic sensor, the Y axis magnetic sensor or the X axis magnetic sensor consists of a two axis magnetic sensor that is capable of measuring both the magnetic field components in the X axis direction and in the Y axis direction perpendicular to the X axis.

With this configuration, since the two axes can be measured by one magnetic sensor, an electronic instrument can be made higher in performance, more miniaturized, and so forth.

An electronic instrument in accordance with a tenth aspect of the present invention is characterized in that the electronic instrument is an electronic azimuth indicator, a wristwatch with an electronic azimuth indicator, a pressure gauge with an electronic azimuth indicator, a car navigation terminal apparatus, a portable electronic instrument with an electronic azimuth indicator, or an electronic instrument with an electronic azimuth indicator.

With this configuration, freedom of designing many electronic instruments such as the above-mentioned ones having magnetic sensors can be increased, and miniaturization and higher performance of the electronic instruments are made possible.

BRIEF DESICRIPTION OF THE DRAWINGS

A preferred form of the present invention is illustrated in the accompanying drawings in which.

DETAILED DESCRIPTION OF THE PREFERRED EMBODIMENTS

An embodiment of the present invention will now be described with reference to the drawings.

Figure 1:
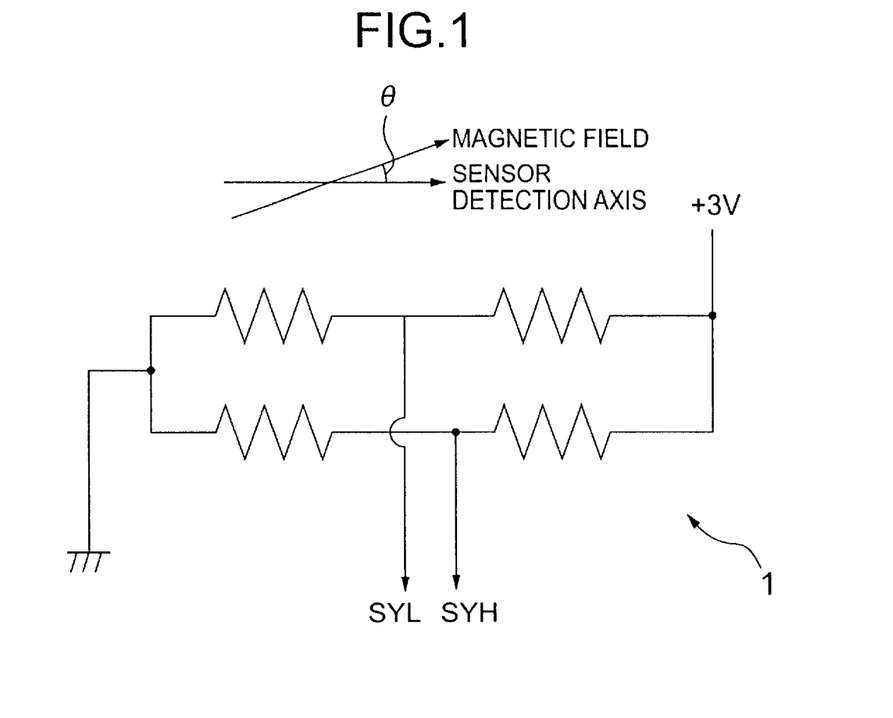
FIG. 1 is an equivalent circuit diagram for illustrating a function of a general magnetic sensor to be used in an electronic instrument.

An equivalent circuit of a general one axis magnetic sensor is shown in FIG. 1. A magnetic sensor 1 is for outputting an electric signal corresponding to a deflection θ with respect to a direction of a magnetic field as a voltage difference between an output signals SYL and SYN. The difference of the output voltage is amplified and converted to a digital signal by a differential amplifier (not shown) and an A/D converter.

Figure 2A:
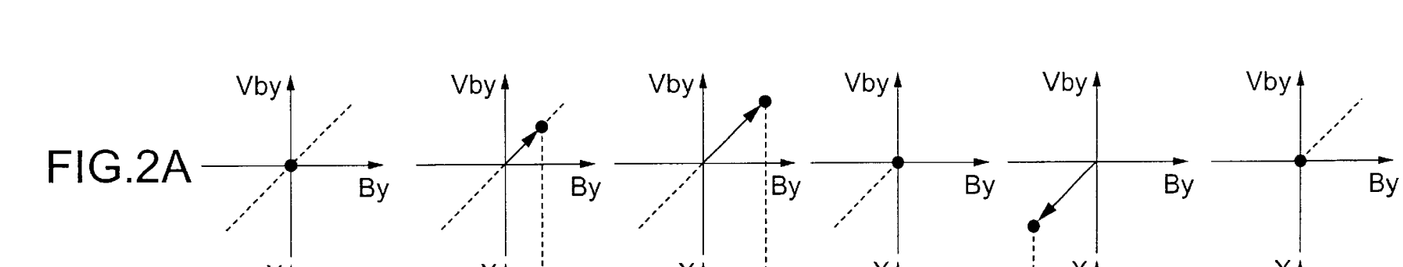
FIG. 2 is an illustration for showing the relationship between a detection signal of a magnetic sensor and a direction of a magnetic field when the magnetic sensor is caused to make a complete turn in an even magnetic field.
Figure 2B:
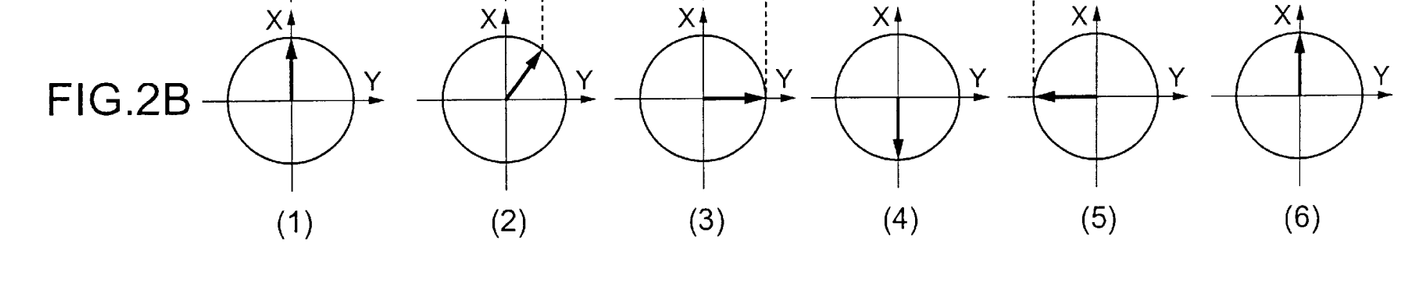

A relationship between a direction of a magnetic field and a detection signal of a magnetic sensor will now be described. FIG. 2 is a diagram illustrating the relationship between a detection signal of a magnetic sensor and a magnetic field in an even magnetic field. In FIG. 2, (1) through (6) show a magnetic component By of the Y axis and detection voltage Vby of the Y axis sensor in the respective directions when the magnetic sensor makes completely turn in the even magnetic field, (b) shows directions of the even magnetic field with respect to the magnetic sensor, and (a) shows the relationship between the magnetic field component By in the Y axis direction and the detection voltage Vby of the Y axis sensor.

(1) in FIG. 2 shows a case in which the X axis of the magnetic sensor and the magnetic field are in the same direction. Then, as can be seen from (a), since the magnetic component By of the Y axis direction is "0", the detection voltage Vby is also "0". (2) in FIG. 2 shows a case in which the magnetic sensor and the magnetic field shift 45° toward the Y axis. (3) shows a state in which the direction of the magnetic field is the same as the Y axis direction. The detection voltage Vby gradually increases as the magnetic sensor turns around from (1) to (3), and when the magnetic field is in the same direction as the Y axis ((3) in FIG. 2), the voltage reaches its largest value. The magnetic sensor is further turned around thereafter, the detection voltage Vby drops to "0" again in a state (4) in which the magnetic field and the magnetic sensor are in the opposite directions. Thereafter, the detection voltage reaches its largest value in the opposite direction when the Y axis of the sensor and the magnetic field are in the opposite directions (5), and then returns to the state in the original position (6).

As the above description have made clear, the relationship between the detection voltage Vb detected by the magnetic sensor and the direction of the magnetic field By shows a linear relation as shown by dotted lines in (b) of (1) through (6) in FIG. 2. Therefore, it is possible to calculate a correct orientation from the voltage Vby that are in a detected output. However, when something that is easily magnetized is placed in the even magnetic field, since the magnetic field is affected and changes its direction near a magnetic body as described above, it has been considered difficult to detect a correct orientation when a magnetic sensor is placed near a magnetic body.

Figure 3:
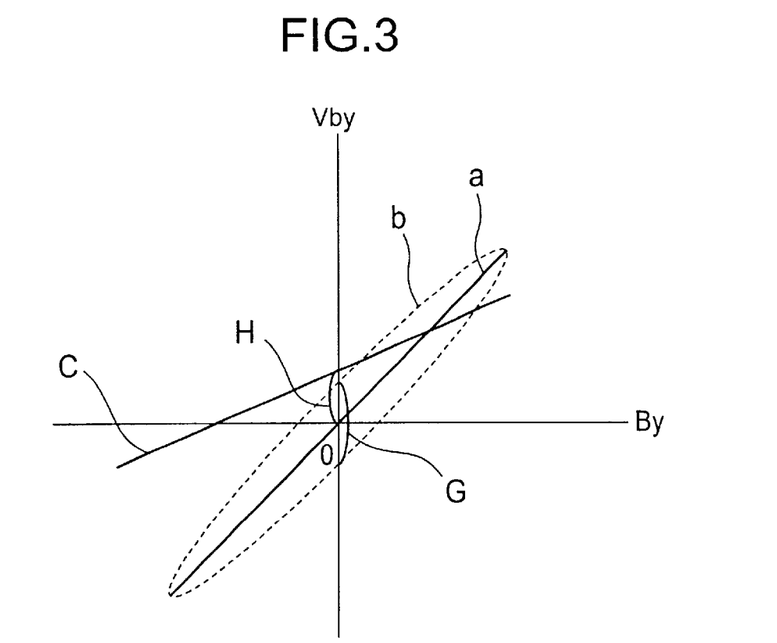
FIG. 3 is a graph showing the relationship between a magnetic field component and a detection voltage Vby when a magnetic sensor is caused to make a complete turn in a magnetic field.

This point will now be described with reference to FIG. 3. FIG. 3 is a graph showing the relationship between the magnetic field component By and the detection voltage Vby when the magnetic sensor is caused to make a complete turn in the magnetic field as in FIG. 2. In order to make description to be easily understood, a case in which nothing is placed in an even magnetic field and a case in which an article that is susceptible to magnetization is placed in the even magnetic field are is shown schematically.

In FIG. 3, a line a indicates an output of the magnetic sensor when the magnetic sensor is placed in the even magnetic field and is caused to made a complete turn in the place, and a line b indicates an example of a case in which an article that is susceptible to magnetization is placed in the even magnetic field and the magnetic sensor is placed in the vicinity thereof to make measurement in the place. A line c indicates an example of a case in which an article that is susceptible to magnetization is placed in the even magnetic field and measurement is made in another place near the article.

As shown by the line a on the graph of FIG. 3, in the even magnetic field, the detection voltage (Vby) of the magnetic sensor is proportional to the magnetic field direction (By), and varies linearly passing the origin O. On the other hand, on the line b indicating a case in which an article that is susceptible to magnetization is placed near the magnetic sensor, the detection voltage (Vby) of the magnetic sensor does not indicate a linear proportional relationship with respect to the change of the magnetic field direction (By), and deflection G is caused in the detection voltage (Vby) by the magnetic field direction (By). In such a case, detection of an accurate orientation is difficult.

The line c in FIG. 3 indicates a case in which an article that is susceptible to magnetization is placed near the magnetic sensor, but the magnetic sensor is arranged in a predetermined position. It is found that, even if an article that is susceptible to magnetization is placed near the magnetic sensor, the relation between the detection voltage Vby) of the magnetic sensor and the magnetic field direction (By) has linearity by arranging the magnetic sensor in a predetermined position. However, inclination of the straight line is different from that in the case of an even magnetic field, and the line does not pass the origin O and is spaced apart from the origin by "H". Therefore, since the relationship has linearity, accurate measurement of orientation is possible if the inclination and the "H" are corrected.

In addition, although not shown in the figure, the distance "H" from the origin O and inclination of the straight line respectively vary depending on a measurement position of the magnetic sensor. Details thereof will be described later.

Under the above-mentioned prerequisite, the inventors of this patent application measured and analyzed data using a button type battery (model number CR2025) manufactured by Matsushita Denchi Kogyo Kabushiki Kaisha and a button type battery (model number CR1616) manufactured by Kabushiki Kaisha Sony Energy Tech in order to find mutual relationship among the direction of a magnetic field, the position of a part that is susceptible to magnetization and the position of a magnetic sensor. As a result, it was found that a position exists where a detection voltage (Vby) of the magnetic sensor varies linearly (hereinafter referred to as "has linearity") in accordance with a direction of a magnetic field (By) even in the vicinity of the battery. This indicates that it is possible to arrange the magnetic sensor and the battery in proximity to each other unlike the above-mentioned prior art.

Figure 4:
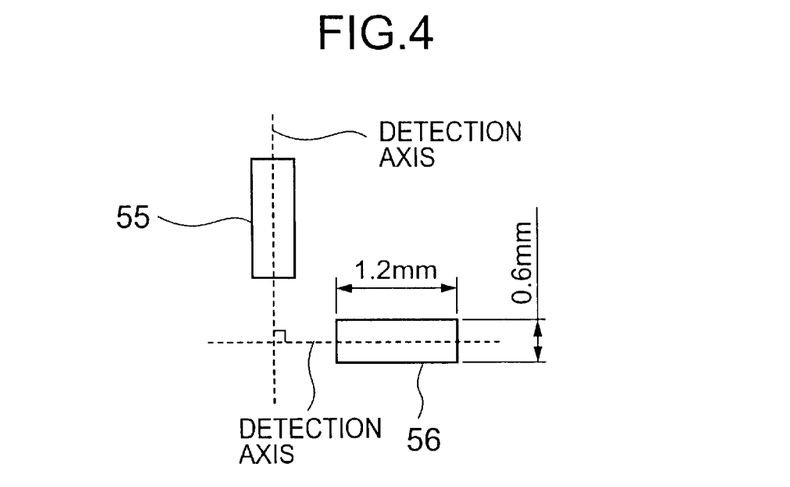
FIG. 4 is an illustration for showing an outer configuration, a size, and a direction of a detection axis of a magnetic sensor used in data measurement for the present invention.

Description will be made with reference to FIGS. 4 through 7. FIG. 4 is a magnetic sensor of a magnetic resistance type used for the data measurement in this experiment. The size of the magnetic sensor is approximately 1.2 mm long, approximately 0.6 mm wide, and approximately 0.4 mm thick, which is extremely small. In addition, a detection axis of magnetism is in a longitudinal direction of the magnetic sensor. Further, the magnetic sensor is similar to a magnetic sensor described in the U.S. Pat. No. 5,521,501.

In FIG. 4, reference numeral 55 denotes an X axis magnetic sensor for detecting a magnetic field component in the X axis direction, and reference numeral 56 denotes a Y axis magnetic sensor for detecting a magnetic field component in the Y axis direction. The X axis magnetic sensor 55 and the Y axis magnetic sensor 56 are implemented on a printed substrate such that the detection axes are perpendicular each other.

Figure 5:
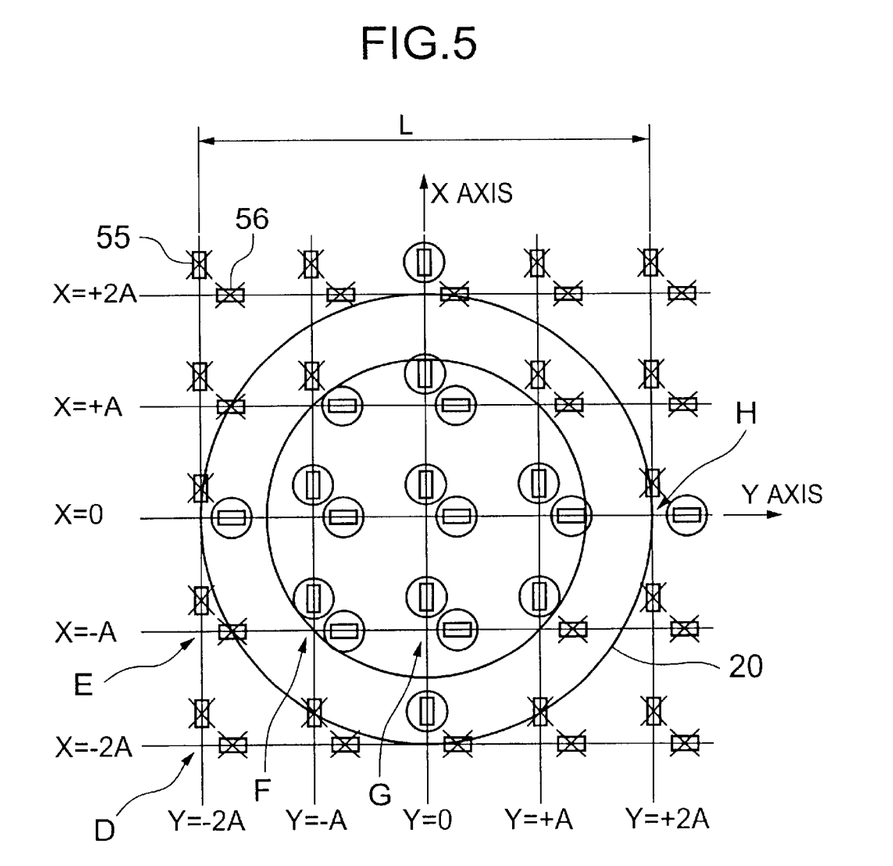
FIG. 5 is an illustration showing an outer configuration of batteries used in an experiment, and a data measuring position and a coordinate, as well as measurement results by a magnetic sensor.

FIG. 5 shows the outer configuration of the above-mentioned batteries manufactured by Matsushita Denchi Kogyo Kabushiki Kaisha and Kabushiki Kaisha Sony Energy Tech, and a data measuring position and a coordinate of the above-mentioned magnetic sensor. FIG. 5 shows the X axis magnetic sensor 55 and the Y axis magnetic sensor 56 when the center of the battery is set in the center of the coordinate axes, the coordinates are divided into a lattice shape with a predetermined distance interval, and the magnetic sensors are arranged such that the point of intersection of the detection axes coincide with the lattice.

Then, as a result of the measurement at each lattice point, if it is recognized that there is linearity between variation of a magnetic field direction (By) and a detection output (Vby), the X axis magnetic sensor 55 or the Y axis magnetic sensor 56 is circled, and if not, the X axis magnetic sensor 55 or the Y axis magnetic sensor 56 is crossed out. Further, the battery used in this experiment has a thin cylindrical shape of CR2025, and has a structure covered by the 304 stainless steel. A diameter L and a lattice interval A of the battery are L=20 mm, A=5 mm in the case of CR2025, and L=16 mm, A=4 mm in the case of CR1616.

Figure 6:
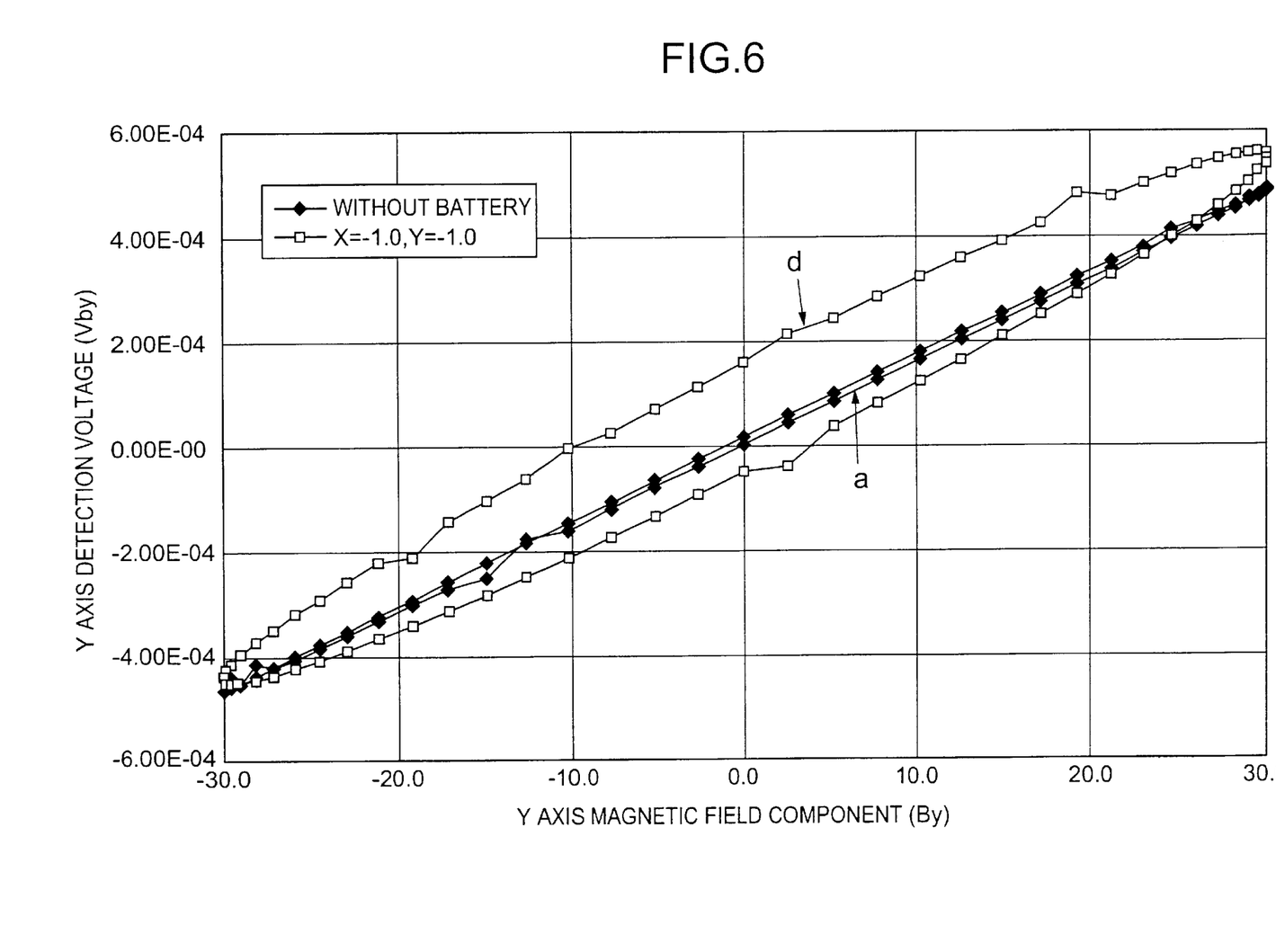
FIG. 6 is a graph plotting actual detection data of a Y axis magnetic sensor in an even magnetic field and in a coordinate D of FIG. 5: Y=−1.0, X=−1.0 of FIG. 5.

Description will now be made using actual detection data. FIG. 6 is a graph plotting actual detection data of the Y axis magnetic sensor in the even magnetic field and in the coordinate D in FIG. 5: Y=−1.0, X=−1.0 (unit: cm) when the battery CR2025 is used, where a line a indicates detection data in the even magnetic field and a line d indicates detection data in the coordinate D. As can be seen from FIG. 6, the line a indicating detection outputs in the even magnetic field shows linearity passing the origin O, and detection outputs measured near the battery form the line d in an oval shape, which does not have linearity.

Figure 7:
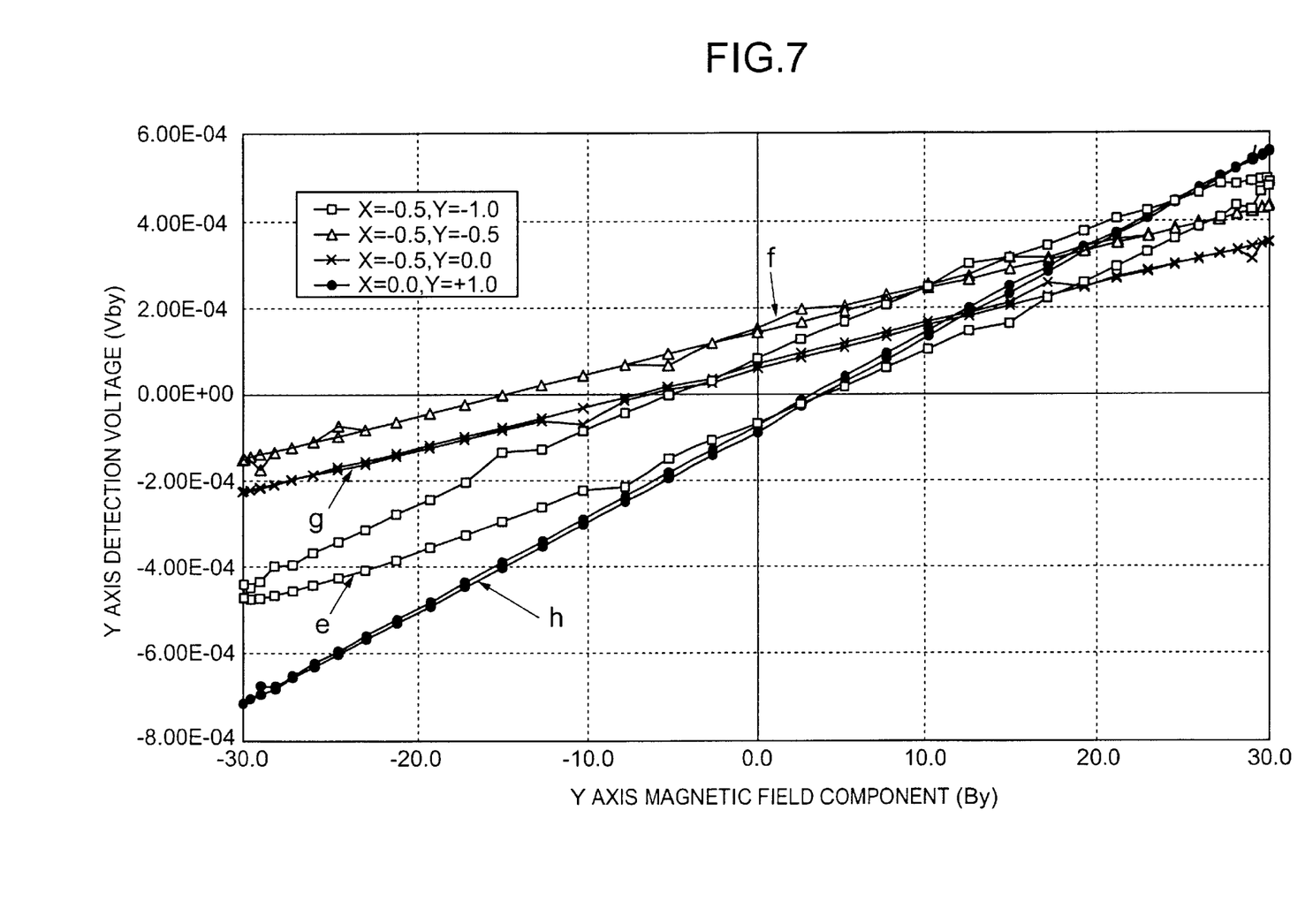
FIG. 7 is a graph plotting actual detection data of the Y axis magnetic sensor in coordinates E, F, G and H in FIG. 5.

FIG. 7 is a graph plotting detection data of the Y axis magnetic sensor in the coordinates E, F and G in FIG. 5 when the battery CR2025 is used. A line e in an oval shape shows detection data of the Y axis magnetic sensor in the coordinate E: Y=−1.0, X=−0.5, and it will be seen that the line does not have linearity as in the case of the coordinate D. A line f plots detection data of the Y axis magnetic sensor in the coordinate F: Y=−0.5, X=−0.5, and it will be seen that, although the line does not pass the origin O, output of the magnetic sensor varies linearly in accordance with the direction of the magnetic field. Lines g and h plot detection data of the Y axis magnetic sensor in the coordinates G: Y=0, X=−0.5 and H: Y=−1.0, X=0. As in the case of the line f, it will be seen that, although the lines do not pass the origin O, output of the magnetic sensor varies linearly in accordance with the direction of the magnetic field.

Therefore, linearity can be acquired if the sensor is arranged in a predetermined area from the center, or even if the sensor is not arranged in a predetermined area, linearity can be acquired when it is arranged on the Y axis. Further, although not illustrated, the X axis magnetic sensor has results similar to the above.

FIG. 5 shows whether or not linearity can be acquired in detection results for each measurement position. In FIG. 5, detection outputs of the X axis magnetic sensor and the Y axis magnetic sensor are measured for each coordinate position shown in the figure as described above, and measurement results are shown for each coordinate position. Through these measurements as well as collection and analysis of data, the following facts have been found. As to be seen from FIG. 7, if the Y axis magnetic sensor is arranged in a distance within approximately $2^{-1/2}$ of the radius R from the center of a battery 20, detection output (Vby) has linearity whichever position the sensor is located. FIG. 7 shows the detection output of the Y axis magnetic sensor, while detection outputs (Vbx) of the X axis magnetic sensor also has linearity as shown in FIG. 5. In addition, although FIG. 7 shows detection data of a battery with the diameter of 20 mm, batteries with different diameters show similar characteristics. In a battery with the diameter of 16 mm manufactured by Kabushiki Kaisha Sony Energy Tech, detection data in the coordinate X=−0.4, Y=−0.4 (unit: cm) shows that the magnetic sensor output (Vby) varies linearly in accordance with change in the direction of the magnetic field (By) similar to the data of the coordinate F in FIG. 7.

In addition, distribution of determinations on the presence or absence of linearity for each coordinate position in the battery with the diameter of 16 mm has the same results as the battery with the diameter of 20 mm. However, in this case, the measurement position interval A shown in FIG. 5 is A=0.4 cm.

Further, it has been found that, even if the X axis magnetic sensor X or the Y axis magnetic sensor Y is arranged in a position exceeding approximately $2^{-1/2}$ of the radius R, when the detection axes (XA, YA) of these sensors are arranged such that the axes overlap an axis passing the center O of the battery 20, linearity is acquired between change in the direction of the magnetic field and the detection output. In this way, if linearity is acquired between the change in the direction of the magnetic field and the detection output, even if the detection axes are shifted from the origin O or the inclination is different, an accurate orientation can be calculated by correcting these deflections.

Figure 8:
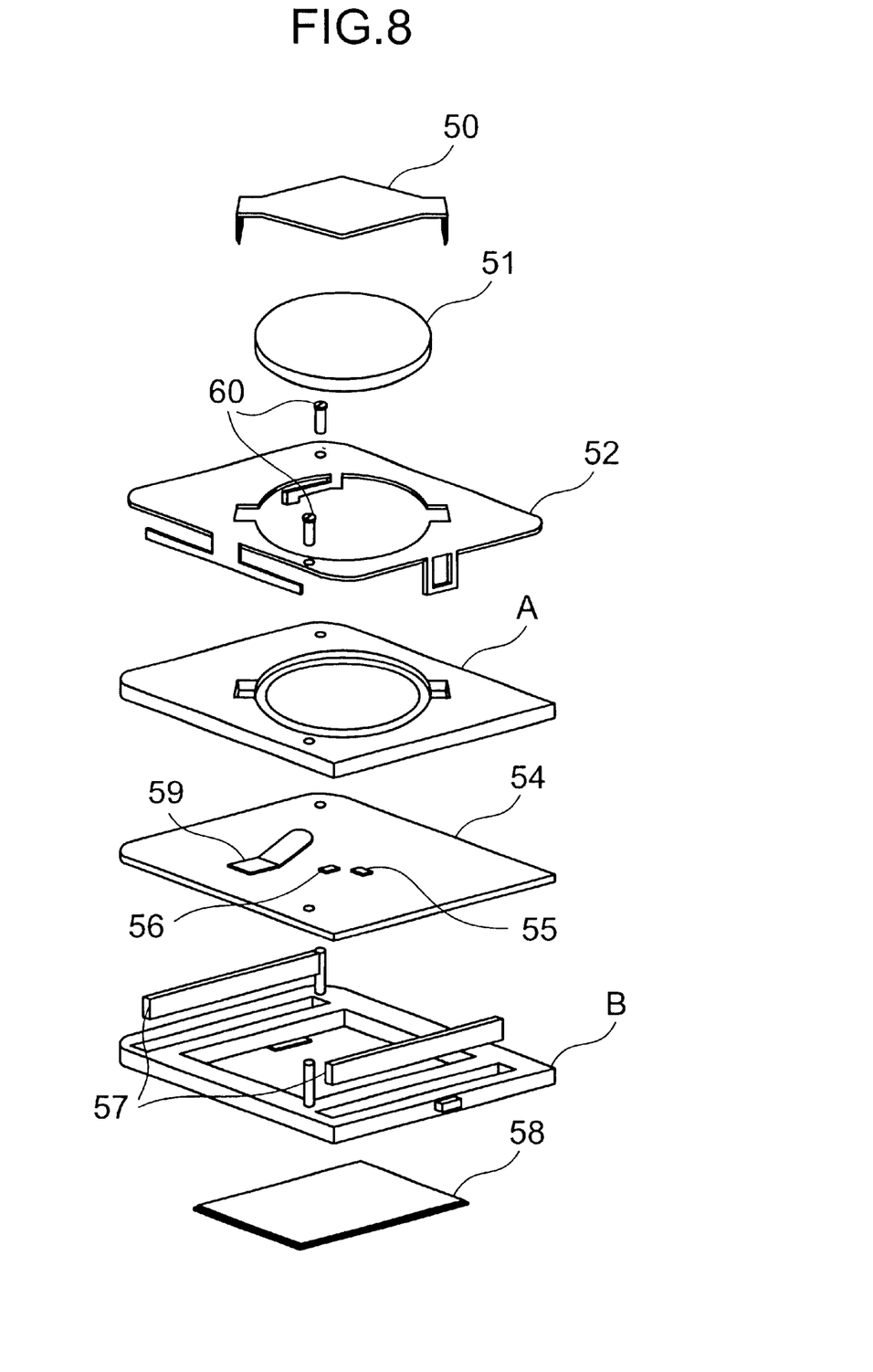
FIG. 8 is an exploded perspective view showing an electronic azimuth indicator in accordance with an embodiment of the present invention.

An embodiment of the present invention will now be described with reference to FIG. 8. FIG. 8 is an exploded perspective view showing a physical structure of an electronic azimuth indicator in accordance with the embodiment of the present invention. FIG. 8 shows only parts necessary for describing the present invention, and smaller parts such as a control unit are omitted. Basically, the electronic azimuth indicator is composed of a battery 51, two magnetic sensors 55 and 56 for detecting magnetic field components of the X axis and the Y axis, and a liquid crystal panel 58 that is a display unit.

The button type battery 51 with a metal such as 304 stainless steel covering its exterior is mounted on a circuit substrate 54 via a battery plus terminal 52 and a frame A while being pressed by a battery cover 50. The battery plus terminal 52 is fixed to the circuit substrate 54 by lock screws 60. A battery minus terminal 59 is provided on the circuit substrate 54 such that the battery minus terminal 59 is pressingly brought into contact with the minus terminal portion of the battery 51 when the battery 51 is mounted.

On the circuit substrate 54, the X axis magnetic sensor 55 for detecting magnetic field component in the X axis direction and the Y axis magnetic sensor 56 for detecting magnetic field component in the Y axis direction are provided in positions close to the center of the battery 51. A frame B is provided under the circuit substrate 54, and the liquid crystal panel 58 is fixed under the frame B. The liquid crystal panel 58 consists of a liquid crystal and a pair of sheets, at least one of which is transparent, for sealing the liquid crystal therebetween. In the liquid crystal panel a plurality of liquid crystal pixels are arranged in a matrix-line manner, and each pixel is driven by an electronic signal. The liquid crystal panel 58 is electrically connected to the circuit substrate by a pair of connectors 57 and performs displaying based on a control signal from a control unit (not shown). Further, the liquid crystal panel 58 may be the one in which all the contents that should be displayed are arranged segmentally in advance using segments.

In this embodiment, miniaturization of the electronic azimuth indicator is attained by providing the magnetic sensors 55 and 56 close to the center of the battery 51. In this way, as described above, since outputs of the magnetic sensors 55 and 56 have linearity with respect to the direction of the magnetic field as long as the magnetic sensors 55 and 56 are arranged in arbitrary positions within an area in a predetermined distance from the center of the battery 51, or on the X axis passing the center of the battery or on the Y axis perpendicular to the X axis, even if the magnetic sensors are in the lower or the upper sides of the battery 51, the accuracy in the orientation detection is not be deteriorated. Therefore, the magnetic sensors can be arranged in arbitrary positions within the above-mentioned area according to necessities of planning or designing, and miniaturization, improvement of design, and reduction of costs can be attained.

Figure 9:
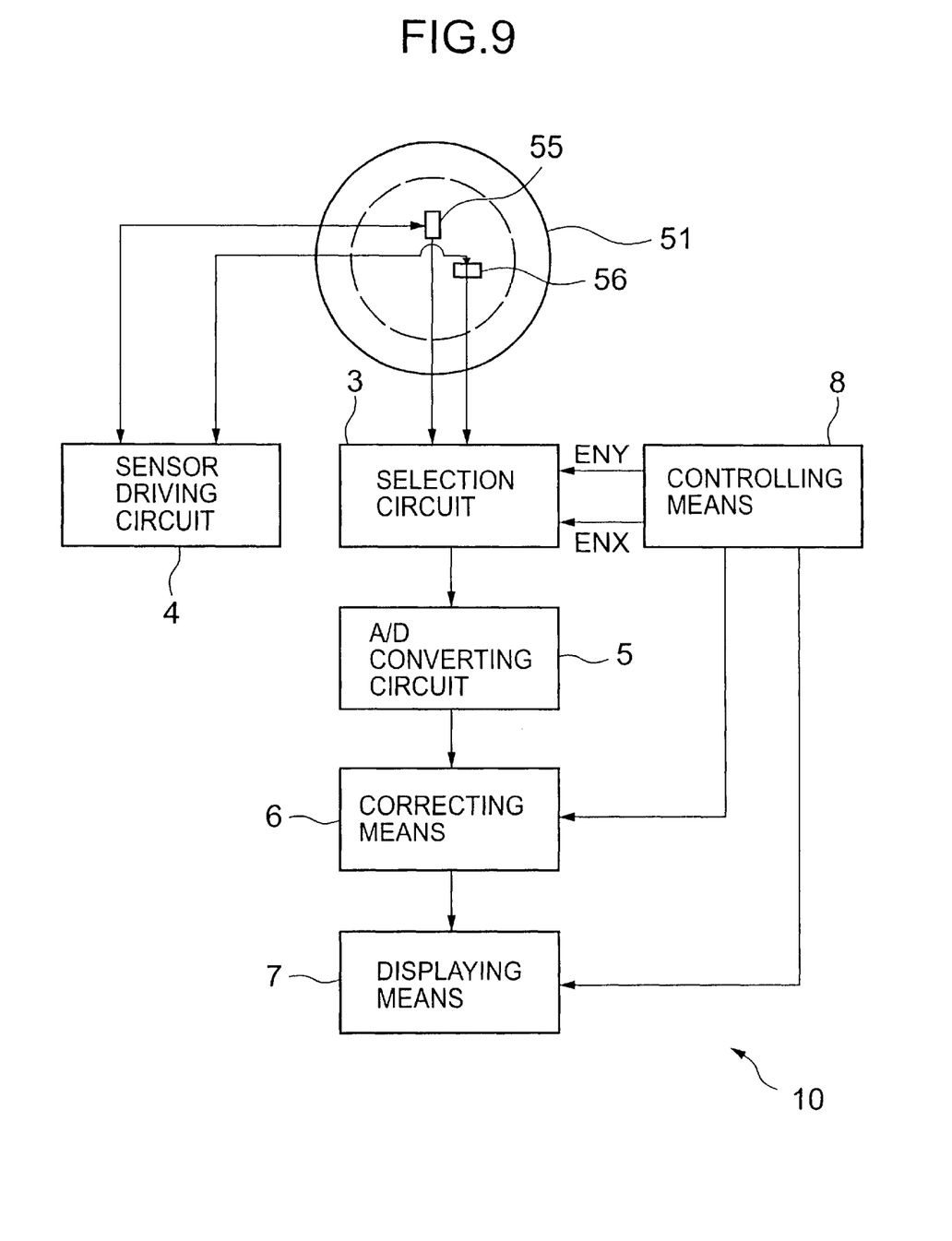
FIG. 9 is a functional block diagram showing an electric configuration of an electronic azimuth indicator 10 in accordance with an embodiment of the present invention.

FIG. 9 is a functional block diagram showing an electric configuration of an electronic azimuth indicator 10 in accordance with an embodiment of the present invention. For ease of understanding, parts that are functionally identical with those in FIG. 8 are denoted by the same numbers. As in FIG. 8, a Y axis magnetic sensor 56 is a magnetic sensor for detecting magnetic field component in the Y axis direction, and an X axis magnetic sensor 55 is a magnetic sensor for detecting magnetic field component in the X axis direction, which detect deflection amounts of the X axis and the Y axis with respect to the geomagnetism as electric signals and output them.

A sensor driving circuit 4 provides driving power to the magnetic sensors 55 and 56. A selection circuit 3 selects the magnetic sensor 55 or 56 that should detect a signal in accordance with control signals ENY and ENX from a control circuit 8. A detection signal from the magnetic sensor 55 or 56 selected by the selection circuit 3 is converted to a digital signal from an analog signal by an A/D converting circuit 5.

A correcting circuit 6 corrects an output signal from the A/D converting circuit 5 in accordance with installed places or characteristics of the magnetic sensors 55 and 56. As shown in the line c of FIG. 3, although a detection output having linearity with respect to changes in the direction of the magnetic field can be acquired from the magnetic sensors 55 and 56 arranged in a predetermined position near a battery 51, an output value is deflected by "H" from the origin O in accordance with the arranged places of the magnetic sensors unlike the case in which the magnetic sensors are arranged in the even magnetic field. Therefore, an accurate orientation is calculated by correcting, using the correcting circuit 6, the deflection due to the arranged places of the magnetic sensors, bias due to characteristics and the like held by each magnetic sensor, as well as shift (declination) of the magnetic north and the north on the map.

An orientation display signal corrected by the correcting circuit 6 is supplied to a displaying circuit 7, and is displayed by the displaying circuit 7 under the control of a controlling circuit 8. Here, as is evident to those having ordinary skills in the art, the controlling circuit 8 and the correcting circuit 6 may respectively be composed of a microprocessor and an RAM, an ROM and the like storing therein a predetermined program or data.

Figure 10:
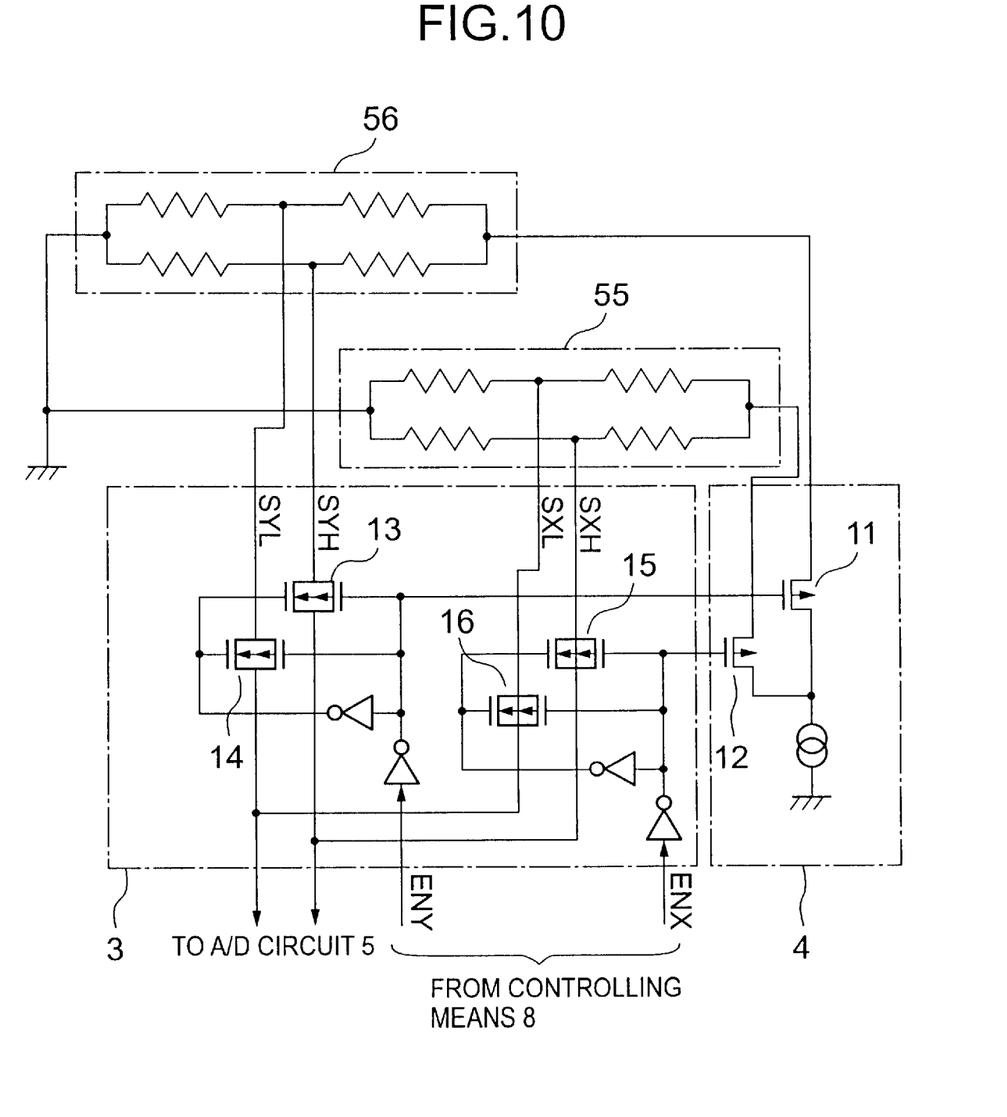
FIG. 10 is a circuit diagram showing more detailed embodiment of a Y axis magnetic sensor 56, a X axis magnetic sensor 55, a sensor driving circuit 4, a the selection circuit 3 of FIG. 4.

More detailed embodiment of the Y axis magnetic sensor 56, the X axis magnetic sensor 55, the sensor driving circuit 4, and the selection circuit 3 of FIG. 9 is shown in FIG. 10. Either of the magnetic sensor 55 or 56 is selected by the control signal ENX or ENY from the controlling circuit 8, and electric power is supplied to the selected magnetic sensor 55 or 56 from the sensor driving circuit 4.

ENY and ENX are not in the active state (are not "H") simultaneously. When ENY is "H", a transistor 11 is in the on state, and driving electric power is supplied to the Y axis magnetic sensor 56. Since switching gates 13 and 14 are open and gates 15 and 16 are closed, output signals SYH and SYL from the Y axis magnetic sensor 56 are sent to the A/D converting circuit 5. Since the gates 15 and 16 are closed then, the output signals SYH and SYL are differential amplified by the A/D converting circuit 5 and, at the same time, are outputted as digital signals corresponding to volumes of the output signals.

Similarly, ENX is a signal for selecting the X axis magnetic sensor 55 which supplies electric power to the X axis magnetic sensor 55 by turning on a transistor 12 and, at the same time, sends outputs SXH and SXL of the X axis magnetic sensor 55 to the A/D converting circuit 5 by opening the switching gates 15 and 16.

As shown in FIG. 9, the output signals SXH, SXL, SYH and SYL are analog/digital converted in the A/D converting circuit 5, and are displayed by the displaying circuit 7 via the correcting circuit 6.

Figure 11A:
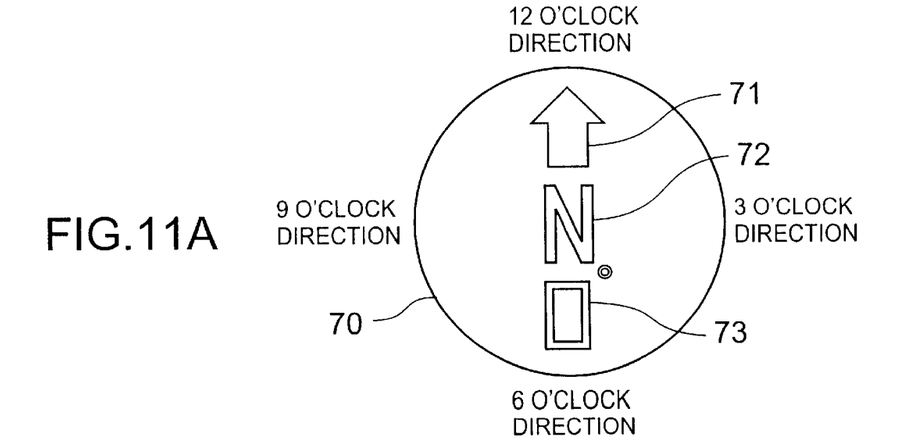
FIGS. 11 are diagrams each showing a display example of an electronic azimuth indicator in accordance with an embodiment of the present invention.
Figure 11B:
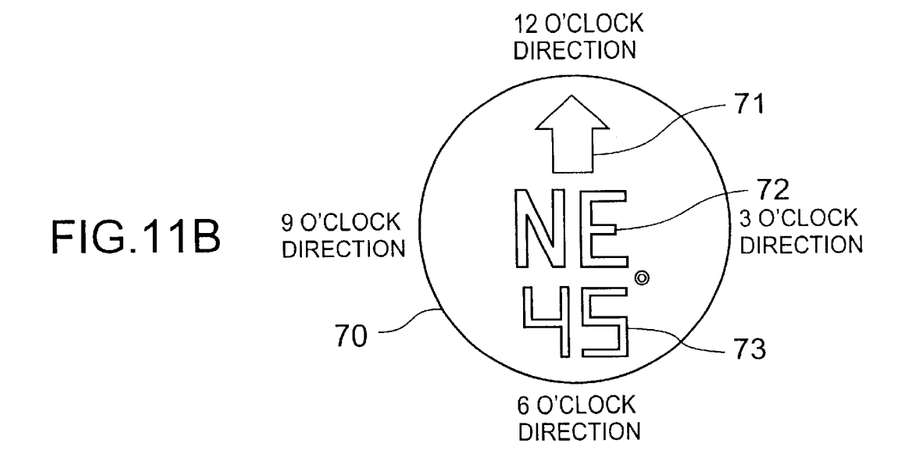
Figure 11C:
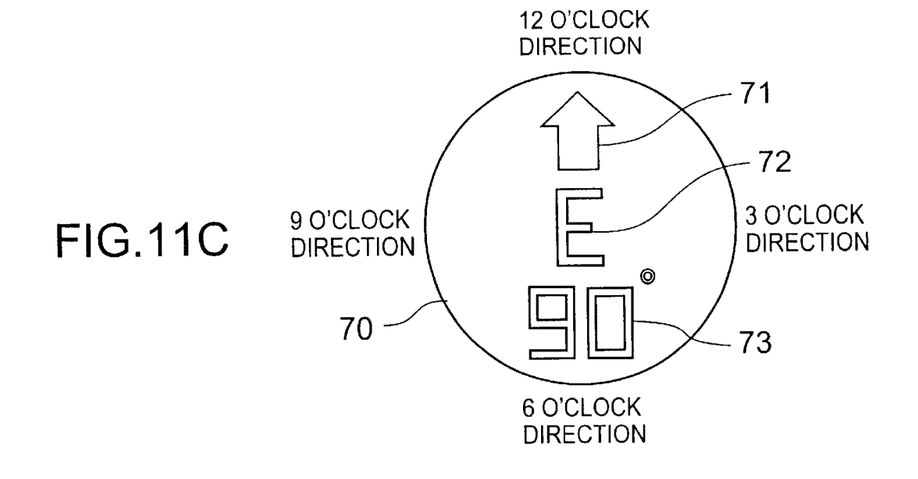

Examples of a case in which display is made by an electronic azimuth indicator 70 are shown in FIG. 11. For example, if the electronic azimuth indicator 70 is directed to the north, a direction indication mark 71 represented by a bold arrow, an orientation 72 represented as N, and a bias angle 73 from the north are shown in FIG. 11A. In this case, since the orientation is "N", that is the north, and the bias is "0", the figure indicates that the direction of the direction indication mark 71 is the north (more strictly, the magnetic north). In FIG. 11B, since the orientation 72 is "NE", that is the northeast, and the angle 73 from the north is "45", the figure indicates that the direction of the direction indication mark 71 is in the orientation 45° from the north. Similarly, FIG. 11C indicates that the direction of the direction indication mark 71 is the east, which is in the orientation 90° from the north. Although display form such as the above is shown here, those having ordinary skills in the art can freely select a display form, a display method, a display medium and the like, for example, an LED may be lit instead of the arrow of the direction indication mark 71.

Figure 12A:
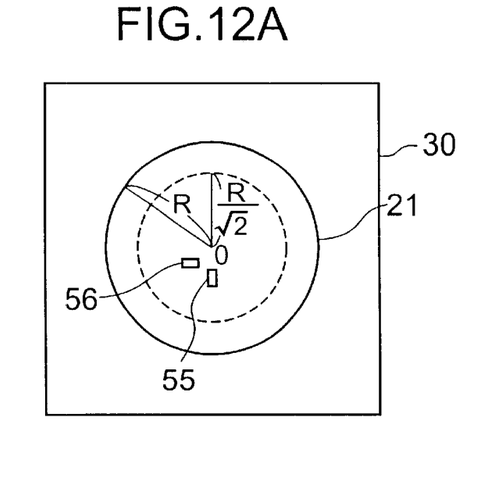
FIGS. 12 are diagrams showing embodiments for showing in detail arranged places of magnetic sensors X and Y in accordance with the present invention.
Figure 12B:
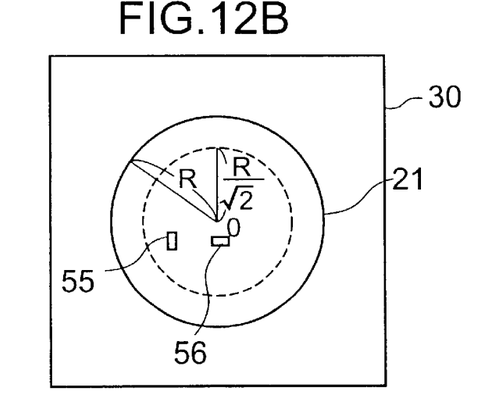

Arrangement of the magnetic sensor will now be described more in detail with reference to FIGS. 12. FIGS. 12 show embodiments for describing in detail arranged places of magnetic sensors 55 and 56 in accordance with the present invention. A component in a circular shape having magnetism (for example, a battery consisting of a frame of 304 stainless steel) 21, the X axis magnetic sensor 55 and the Y axis magnetic sensor 56 respectively provided in an electronic instrument 30 are shown in FIG. 12A through FIG. 12E. FIG. 12A and FIG. 12B of are examples in which the X axis magnetic sensor 55 and the Y axis magnetic sensor 56 are arranged in a distance within $2^{-1/2}$ of the radius R from the center O of a component 21. The sensors can be arranged in arbitrary positions as long as the positions are within the area. Detection axis orientations of the sensors do not need to be on an axis passing the center O of the component. The X axis magnetic sensor 55 and the Y axis magnetic sensor 56 are arranged such that their detection angles are perpendicular to each other.

Figure 12C:
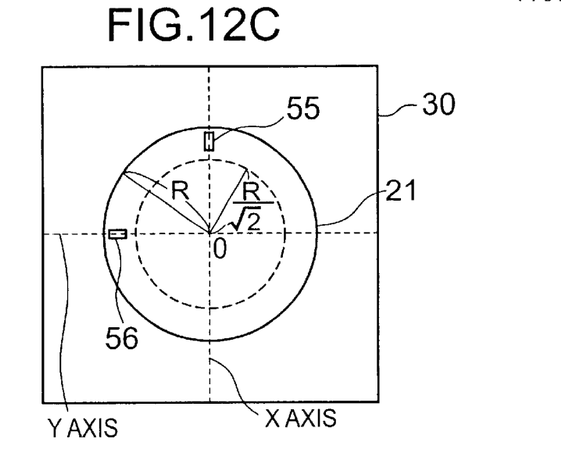

FIG. 12C shows an example of a case in which the X axis magnetic sensor 55 and the Y axis magnetic sensor 56 are arranged outside $2^{-1/2}$ of the radius R of the component 21 and in the vicinity of the circumference of the component 21. In this case, the magnetic sensor 55 or 56 must be arranged on an X axis or a Y axis passing the center O of the component 21 such that the detection axes of the magnetic sensors 55 and 56 overlap the X axis and the Y axis.

Figure 12D:
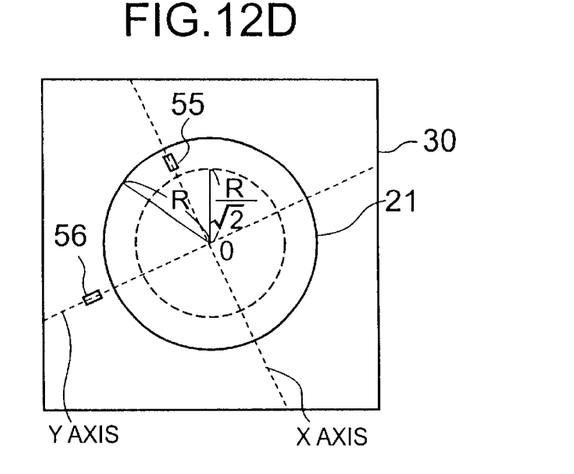
Figure 12E:
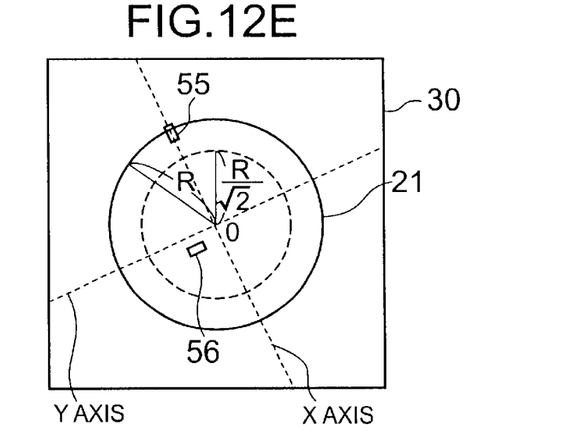

FIG. 12D is an example in which only the Y axis magnetic sensor 56 is arranged outside the component 21 in FIG. 12C. In this case as well, the Y axis magnetic sensor 56 must be arranged on the Y axis such that its detection axis overlaps the Y axis passing the center of the component 21. In FIG. 12E, the X axis magnetic sensor 55 is arranged in a position slightly outside the circumference of the component 21, and the Y axis magnetic sensor 56 is provided in a position within $2^{-1/2}$ of the radius R from the center of the component 21. In this case, although the X axis magnetic sensor 55 must be on the X axis passing the center O of the component 21 as in FIG. 12C and FIG. 12D, the Y axis magnetic sensor 56 can be provided in an arbitrary position within $2^{-1/2}$ of the radius R.

Figure 13A:
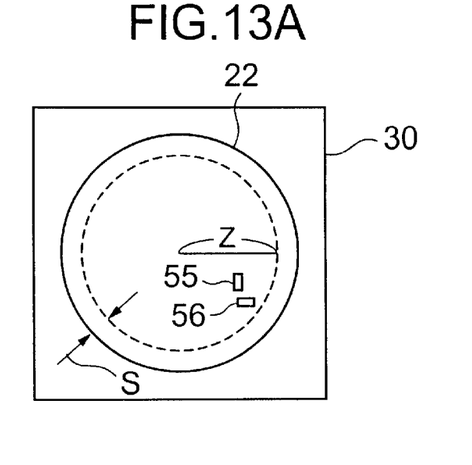
FIGS. 13 are illustrations showing examples of magnetism exhibited in the vicinity of the circumference of 304 stainless steel and the like by die cutting or part molding for forming the stainless steel and the like into a circular shape, and an arrangement of an magnetic sensor for this purpose.
Figure 13B:
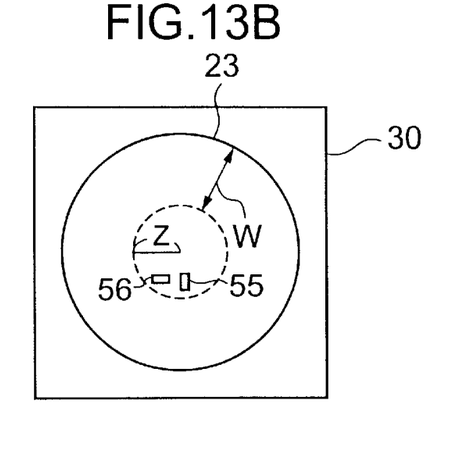

FIGS. 13 show arrangements of the X axis magnetic sensor 55 and the Y axis magnetic sensor 56 in a case in which a place assuming magnetism varies depending upon stress applied by bending or die cutting and materials. For example, if a place assuming magnetism is limited to a considerably small vicinity of the circumference S, the magnetic sensors 55 and 56 can be arranged within an area not affected by the magnetism (within the area of the radius Z) (see FIG. 13A). To the contrary, as shown in FIG. 13B, if a place assuming magnetism by such processing and the like extends from a large circumference to an area of a distance W, the arranged places of the magnetic sensors 55 and 56 are limited to a small area not affected by the magnetism (an area of the radius Z). However, in a case in which the sensors are arranged on axes passing the center O of the components 22 and 23, arrangement is the same as described in FIG. 12.

Although the magnetic sensor described above has one detection axis, the same is true for a magnetic sensor having two detection axes of an X axis and a Y axis.

As described above, the present invention has bee devised based on the knowledge from various kinds of analysis data that, when a direction of magnetism changes, a detection output of a magnetic sensor has relationship with a direction of magnetism to change linearly in accordance with the change in direction of magnetism (linearity) as long as the magnetic sensor is within the above-mentioned area even if it is placed in the lower side or the upper side of a substance that is susceptible to magnetization. Although reasons why such a characteristic is shown are not accurately and theoretically solved at the present time, it is considered that such a characteristic might be expressed due to stress when a part made of a material such as 304 stainless steel is bent or die cut in a circular shape. At present, since many button batteries are used as a power source of a compact electronic instrument, and most of such button batteries use 304 stainless steel, it is extremely beneficial if a magnetic sensor can be arranged in the upper side or the lower side of such a button battery.

The present invention is applicable if a magnetic sensor is used together with a circular or substantially circular component that is susceptible to magnetization. Therefore, the present invention can be embodied not only in an electronic azimuth indicator, but also in any electronic instruments including a magnetic sensor, such as an electronic wristwatch, a pressure gauge, a barometer, a car navigation terminal apparatus or an electronic notebook, all having an azimuth indicator, and therefore the present invention is applied to all of these electronic instruments.

As described above, since the present invention enables to arrange a magnetic sensor above or below of a circular part that is susceptible to magnetization or in its vicinity while maintaining the ability of the magnetic sensor at high in precision, whereas conventionally a magnetic sensor is spaced apart from a part that is susceptible to magnetization, freedom in designing an electronic instrument is considerably increased, and not only miniaturization of an electronic instrument is made possible but also freedom in relation to forms such as a design can be increased. In addition, according to the present invention, a compact and high-precision electronic azimuth indicator, an electronic instrument having such an azimuth indicator, or a portable electronic instrument having such an azimuth indicator can be provided.

According to the first aspect of the present invention, since a magnetic sensor is arranged in an arbitrary position in a distance within approximately $2^{-1/2}$ of the radius from the center of a circular or substantially circular component that is susceptible to magnetization, the magnetic sensor can be arranged in an arbitrary position as long as it is within a predetermined distance from the center even if it is placed in the upper side or the lower side of the circular or substantially circular component that is susceptible to magnetization. Therefore, the magnetic sensor and the component in a circular shape or the like that is susceptible to magnetization can be arranged in a position where the two overlap in a proximate cross-sectional direction. In addition, since freedom of selecting a place to arrange a magnetic sensor is expanded in designing an electronic instrument, the electronic instrument can be miniaturized while maintaining high-precision.

According to the second aspect of the present invention, since a magnetic sensor to output a signal corresponding to a direction of a magnetic field is arranged in an arbitrary position on an arbitrary straight line passing the center of a circular or substantially circular component that is susceptible to magnetization such that the straight line and a detection axis of magnetism coincide, even if the magnetic sensor cannot be arranged in an arbitrary position within a predetermined distance from the center of the circular or substantially circular component that is susceptible to magnetization, it can be arranged in an arbitrary position on an arbitrary straight line passing the center of the component such that the straight line and a detection axis of magnetism coincide. In addition, a magnetic sensor can be arranged two-dimensionally in the vicinity of a component in a circular shape or the like without overlapping each other. In addition, freedom of designing a place to arrange a magnetic sensor is expanded in designing an electronic instrument, and it is made possible to miniaturize the electronic instrument while maintaining high-precision.

According to the third aspect of the present invention, by arranging an X axis magnetic sensor in a position within a predetermined distance from a circular or substantially circular component that is susceptible to magnetization, or in an arbitrary position on an X axis passing the center of the component or its extended line, and arranging a Y axis magnetic sensor in a position within a predetermined distance from the component in a circular or substantially circular shape that is susceptible to magnetization, or in an arbitrary position on a Y axis perpendicular to the X axis of the component or its extended line, even if the X axis magnetic sensor and the Y axis magnetic sensor are used, each of the magnetic sensors can be arranged in a considerably free position with respect to the component. In addition, freedom of designing can be further increased, and miniaturization and the like can be possible while maintaining high precision.

According to the fourth aspect of the present invention, since a component that is susceptible to magnetization is a battery made of 304 stainless steel, it can be detected without being affected by a button battery and the like. Further, since a magnetic sensor does not need to be spaced apart from the battery, an electronic instrument can be made higher in performance and miniaturized, and so forth.

According to the fifth aspect of the present invention, by arranging a magnetic sensor in a position inside the vicinity of the circumference assuming magnetism of a circular or substantially circular component assuming magnetism in the vicinity of its circumference assuming magnetism by processing, the magnetic sensor can be arranged in an arbitrary position in a predetermined distance from the center of the component in a circular shape, and can be miniaturized while maintaining high precision.

According to the sixth aspect of the present invention, since a magnetic sensor is arranged in an arbitrary position on an arbitrary straight line passing the center of a circular or substantially circular component assuming magnetism in the vicinity of its circumference by processing such that the straight line and a detection axis of magnetism coincide, even if the magnetic sensor is placed in the upper side or the lower side of the circular or substantially circular component assuming magnetism in the vicinity of its circumference by processing, or the magnetic sensor cannot be arranged in an arbitrary position within a predetermined distance from the center, it can be arranged in an arbitrary position on an arbitrary straight line passing the center of the component such that the straight line and a detection axis of magnetism coincide. In this way, freedom of selecting a place for arranging a magnetic sensor is expanded in designing an electronic instrument, and miniaturization and the like of the magnetic sensor is made possible while maintaining high precision.

According to the seventh aspect of the present invention, by arranging an X axis magnetic sensor in a position within a predetermined distance from a circular or substantially circular component assuming magnetism in the vicinity of its circumference by processing, or in an arbitrary position on an X axis passing the center of the component or its extended line, and arranging a Y axis magnetic sensor in a position within a predetermined distance from the component in a circular of substantially circular shape assuming magnetism in the vicinity of its circumference by processing, or in an arbitrary position on a Y axis perpendicular to the X axis of the component or its extended line, even if the X axis magnetic sensor and the Y axis magnetic sensor are used, each of the magnetic sensors can be arranged in a considerably free position with respect to the component. In this way, the magnetic sensor can be arranged in a predetermined position near the component in a circular shape. In addition, freedom of designing can be further increased, and miniaturization and the like are made possible while maintaining high precision.

According to the eighth aspect of the present invention, since a circular or substantially circular component assuming magnetism in the vicinity of its circumference by processing is a battery made of 304 stainless steel, it is not affected by a button battery and the like. Further, an electronic instrument using such a buttery and the like can be made higher in performance, more miniaturized, and so forth.

According to the ninth aspect of the present invention, since a magnetic sensor, a Y axis magnetic sensor or a X axis magnetic sensor is the one consisting of a two axis magnetic sensor that is capable of measuring both magnetic field components of a X axis direction and a Y axis direction perpendicular to the X axis, an electronic instrument using such a battery and the like can be made higher in performance, more miniaturized, and so forth.

According to the tenth aspect of the present invention, by making an electronic instrument an electronic azimuth indicator, an electronic wristwatch with an electronic azimuth indicator, a pressure gauge with an electronic azimuth indicator, a car navigation terminal apparatus with an electronic azimuth indicator, a portable electronic instrument with an electronic azimuth indicator, or an electronic instrument with an electronic azimuth indicator, freedom to design all of these electronic instrument having a magnetic sensor can be increased, and the electronic instrument can be more miniaturized and made higher in performance.

What is claimed is:

1. An electronic instrument having a magnetic sensor, comprising:
   a circular or substantially circular component that is susceptible to magnetization;
   a magnetic sensor located within a magnetic field generated by the circular or substantially circular component for outputting a signal corresponding to a direction of an incident magnetic field and being disposed at a distance no further than approximately $2^{-1/2}$ of the radius from the center of the circular or substantially circular component; and
   a correcting circuit for correcting the signal output from the magnetic sensor in accordance with the relative position between the component and the magnetic sensor.

2. An electronic instrument having a magnetic sensor according to claim 1; wherein the component that is susceptible to magnetization is a battery made of stainless steel.

3. An electronic instrument having a magnetic sensor according to claim 1; wherein the magnetic sensor comprises a two-axis magnetic sensor that is capable of measuring both the magnetic field components in an X axis direction and in a Y axis direction perpendicular to the X axis.

4. An electronic instrument having a magnetic sensor according to claim 1; wherein the electronic instrument is one of an electronic azimuth indicator, a wristwatch having an electronic azimuth indicator, a pressure gauge having an electronic azimuth indicator, a car navigation apparatus, a portable electronic instrument having an electronic azimuth indicator, or an electronic instrument with an electronic azimuth indicator.

5. An electronic instrument having a magnetic sensor comprising:
   a circular or substantially circular component assuming magnetism in the vicinity of its circumference by processing;
   a magnetic sensor located within a magnetic field generated by the circular or substantially circular component for outputting a signal corresponding to a direction of an incident magnetic field and being disposed within the vicinity of the circumference assuming magnetism of the circular or substantially circular component; and
   a correcting circuit for correcting the signal output by the magnetic sensor in accordance with the relative position between the component and the magnetic sensor.

6. An electronic instrument having a magnetic sensor according to claim 5; wherein the circular or substantially circular component is a battery made of stainless steel.

7. An electronic instrument having a magnetic sensor according to claim 5; wherein the magnetic sensor comprises a two-axis magnetic sensor that is capable of measuring both the magnetic field components in an X axis direction and in a Y axis direction perpendicular to the X axis.

8. An electronic instrument having a magnetic sensor according to claim 5; wherein the electronic instrument is one of an electronic azimuth indicator, a wristwatch having an electronic azimuth indicator, a pressure gauge having an electronic azimuth indicator, a car navigation apparatus, a portable electronic instrument having an electronic azimuth indicator, or an electronic instrument with an electronic azimuth indicator.

* * * * *